(12) United States Patent
Zhou

(10) Patent No.: US 9,750,011 B2
(45) Date of Patent: Aug. 29, 2017

(54) RESOURCE ALLOCATION METHOD, APPARATUS, AND SYSTEM IN FIXED BROADBAND NETWORK

(71) Applicant: China Academy of Telecommunications Technology, Beijing (CN)

(72) Inventor: Yanfei Zhou, Beijing (CN)

(73) Assignee: CHINA ACADEMY OF TELECOMMUNICATIONS TECHNOLOGY, Beijing (CN)

( * ) Notice: Subject to any disclaimer, the term of this patent is extended or adjusted under 35 U.S.C. 154(b) by 237 days.

(21) Appl. No.: 14/421,441

(22) PCT Filed: Jul. 31, 2013

(86) PCT No.: PCT/CN2013/080521
§ 371 (c)(1),
(2) Date: Feb. 13, 2015

(87) PCT Pub. No.: WO2014/026545
PCT Pub. Date: Feb. 20, 2014

(65) Prior Publication Data
US 2015/0189637 A1    Jul. 2, 2015

(30) Foreign Application Priority Data

Aug. 13, 2012 (CN) .......................... 2012 1 0287746

(51) Int. Cl.
*H04W 72/04* (2009.01)
*H04W 28/16* (2009.01)
(Continued)

(52) U.S. Cl.
CPC ........... *H04W 72/044* (2013.01); *H04W 8/18* (2013.01); *H04W 12/08* (2013.01); *H04W 28/16* (2013.01);
(Continued)

(58) Field of Classification Search
CPC ..... H04W 28/16; H04W 12/08; H04W 88/16; H04W 12/06; H04W 72/00; H04W 28/08;
(Continued)

(56) References Cited

U.S. PATENT DOCUMENTS

| | | | |
|---|---|---|---|
| 2011/0131313 A1* | 6/2011 | Zhou ..................... | H04Q 3/0045 709/223 |
| 2011/0138066 A1* | 6/2011 | Kopplin .................. | H04L 47/10 709/228 |
| 2012/0275348 A1* | 11/2012 | Zhou ....................... | H04L 12/14 370/259 |

FOREIGN PATENT DOCUMENTS

| CN | 101227714 A | 7/2008 |
|---|---|---|
| CN | 101370157 A | 2/2009 |

(Continued)

OTHER PUBLICATIONS

An Office Action issued on Jan. 26, 2016 in the CN counterpart application (201210287746.6).
(Continued)

*Primary Examiner* — Michael Thier
*Assistant Examiner* — Rownak Islam
(74) *Attorney, Agent, or Firm* — Kilpatrick Townsend & Stockton LLP

(57) ABSTRACT

This application relates to communication technologies, and disclosed are a resource allocation method, apparatus, and system in a fixed broadband network. After an RG is accessed, a PCRF sends an AMBR parameter for an access line corresponding to the RG to an IP border gateway; and when a device is accessed through the RG, the IP border gateway counts and multiplexes, according to the AMBR parameter and between devices accessed through the RG, bandwidth resources of the access line corresponding to the RG, so as to improve the utilization of network resources.

10 Claims, 7 Drawing Sheets

A PCRF receives a session establishment request, transmitted by an IP edge gateway upon determining completed authentication of an RG, carrying the identifier of an access line corresponding to the RG — S801

The PCRF returns a session establishment response carrying an AMBR parameter to a BNG, and when there are devices accessing through the RG, the IP edge gateway statistical multiplexes a bandwidth resource of the access line corresponding to the RG among the devices accessing through the RG according to the AMBR parameter — S802

(51) Int. Cl.
*H04W 8/18* (2009.01)
*H04W 12/08* (2009.01)
*H04W 76/04* (2009.01)
*H04W 28/06* (2009.01)
*H04W 28/22* (2009.01)
*H04W 88/16* (2009.01)

(52) U.S. Cl.
CPC .......... *H04W 76/045* (2013.01); *H04W 28/06* (2013.01); *H04W 28/22* (2013.01); *H04W 88/16* (2013.01)

(58) Field of Classification Search
CPC ....... H04W 88/18; H04W 8/18; H04W 28/18; H04W 72/04; H04W 76/045; H04W 28/06; H04W 28/22; H04W 72/044; H04W 88/04
USPC ........................................................ 370/231
See application file for complete search history.

(56) References Cited

FOREIGN PATENT DOCUMENTS

| | | |
|---|---|---|
| CN | 101562842 A | 10/2009 |
| CN | 101662415 A | 3/2010 |
| CN | 101753323 A | 6/2010 |
| CN | 102118796 A | 7/2011 |
| CN | 102131240 A | 7/2011 |
| CN | 102131296 A | 7/2011 |
| CN | 102457847 A | 5/2012 |
| EP | 1933499 A1 | 6/2008 |
| EP | 2081332 A1 | 7/2009 |
| WO | 2009021408 A1 | 2/2009 |
| WO | 2011054241 A1 | 5/2011 |
| WO | 2011143939 A1 | 11/2011 |

OTHER PUBLICATIONS

International Search Report for PCT/CN2013/080521.
Gundavelli M Grayson Cisco P Seite France Telecom-Orange Y Lee Comcast S: "Service Provider Wi-Fi Services Over Residential Architectures; draft-gundavelli-v6ops-community-wifi-svcs-04.txt", Service Provider Wi-Fi Services Over Residential Architectures; Draft-Gundavelli-V6OPS-Community-Wifi-SVCS-04.Txt, Internet Engineering Task Force, IETF; Standardworkingdraft. Internet Society (ISOC) 4. Rue Des Falaises CH-1285 Geneva, Switzerland, 38 Apr. 2812 (2812-84-38), pp. 1-18, XP815882641, [retrieved on 2812-84-38] *paragraph [84.8]; figure 1 *.
Extended European Search Report issued on Jun. 12, 2015 in the EP counterpart application (13829106.7).

* cited by examiner

RESOURCE ALLOCATION METHOD, APPARATUS, AND SYSTEM IN FIXED BROADBAND NETWORK

The present application is a US National Stage of International Application No. PCT/CN2013/080521, filed Jul. 31, 2013, designating the United States, and claiming the benefit of Chinese Patent Application No. 201210287746.6, filed with the Chinese Patent Office on Aug. 13, 2012 and entitled "Method, device and system for allocating resource of fixed broadband network", which are hereby incorporated by reference in their entireties.

FIELD

The present disclosure relates to the field of communications and particularly to a method, device and system for allocating a resource of a fixed broadband network.

BACKGROUND

With the existing technologies to integrate fixed and mobile devices, control session are established respectively for a Residential Gateway (RG) and a device accessing through the residential gateway (a fixed device or a User Equipment (UE)), and Quality of Service (QoS) policies are issued respectively in the sessions.

Particularly such a scenario occurs in the $3^{rd}$ Generation Partnership Project (3GPP) Release 12 that a 3GPP UE and a fixed device access through a fixed broadband network but traffic is offloaded from a Broadband Network Gateway (BNG) to a network which is not the core network of the operator (e.g., the Internet). In the scenario above, integrated policy and charging management is performed in such a way that a Policy and Charging Rule Function (PCRF) in the core network transmits a policy to the BNG, and the BNG schedules a resource in the fixed broadband network under the policy, that is, the eBNG functions as a policy enforcement entity, i.e., a Policy and Charging Enforcement Function (PCEF).

FIG. 1 illustrates a schematic architectural diagram of the scenario including an Internet Protocol (IP) edge gateway, a Residential Gateway (RG), a 3GPP UE or a fixed device (e.g., an IPTV device, etc.), and a Broadband Forum Authorization, Authentication and Accounting (BBF AAA), where the 3GPP UE or the fixed device accesses the IP edge gateway through the RG, the BBF AAA functions to authenticate a fixed access, etc., and policy and charging related information is transmitted via a Gxd interface between the IP edge gateway and the PCRF.

The BNG is a form of the IP edge gateway, and in the integration scenario, the fixed device accessing the fixed broadband network triggers the BNG to initiate an IP Connectivity Access Network (IP-CAN) session establishment procedure to the PCRF in which the PCRF returns a policy to the BNG. FIG. 2 illustrates a particular flow thereof including:

Operation S201. The fixed device (e.g., a device accessing through the RG, etc.) accesses the fixed broadband network to trigger an access line authentication procedure;

Operation S202. The BNG transmits to the PCRF an IP-CAN establishment message including a subscription identifier (ID), an access line ID (including a physical access ID and a logical access ID) and other information;

Operation S203. The PCRF retrieves subscription information of the fixed device from a Subscription Profile Repository (SPR);

Operation S204. The PCRF makes a policy decision and derives a QoS rule with QoS parameters which can including a Quality of Service (QoS) Class Identifier (QCI), an Allocation and Retention Priority (APR), a Maximum Bit Rate (MBR), etc.;

Operation S205. The PCRF returns QoS rules to the PCRF, i.e., the BNG; and

Operation S206. The BNG performs differentiated control on data in the fixed broadband network under the obtained QoS rules.

As can be apparent, the respective devices are controlled individually in the existing QoS control mechanism.

In the fixed broadband access network, the RG is activated to trigger an IP-CAN session between the BNG and the PCRF, and the PCRF allocates a set of QoS rules for the RG; and alike when the fixed device is activated, or the 3GPP UE accesses the fixed broadband network in an NSWO manner, the PCRF also allocates a set of QoS rules for the BNG. Stated otherwise, the BNG needs to schedule a resource under the plurality of sets of QoS rules between the BNG and the RG. However since neither the relationship between the QoS rules allocated for the RG and the QoS rule allocated for the device (including the fixed device and the 3GPP UE) nor the correlation between the parameters of the two sets of QoS rules has been defined, the parameters in these QoS Rules have been independent of each other so far, but only the single devices can be controlled and the network resources have been underutilized.

SUMMARY

Embodiments of the disclosure provide a method, device and system for allocating a resource of a fixed broadband network so as to improve the ratio of utilizing the network resource.

There is a method for allocating a resource of a fixed broadband network, the method including:

transmitting, by an Internet Protocol (IP) edge gateway, a session establishment request to a Policy and Charging Rule Function (PCRF) upon determining authentication of a Residential Gateway (RG) is completed, the session establishment request carries an identifier of an access line corresponding to the RG;

receiving a session establishment response sent by the PCRF; and when there are devices accessing through the RG, statistical multiplexing a bandwidth resource of the access line corresponding to the RG among the devices accessing through the RG according to an Aggregated Maximum Bit Rate (AMBR) parameter carried in the session establishment response.

There is a method for allocating a resource of a fixed broadband network, the method including:

receiving, by a Policy and Charging Rule Function (PCRF) a session establishment request, transmitted by an Internet Protocol (IP) edge gateway upon determining authentication of a Residential Gateway (RG) is completed, the session establishment request carries an identifier of an access line corresponding to the RG; and returning, by the PCRF, a session establishment response carrying an Aggregated Maximum Bit Rate (AMBR) parameter to the IP edge gateway, and when there are devices accessing through the RG, statistical multiplexing, by the IP edge gateway, a bandwidth resource of the access line corresponding to the RG among the devices accessing through the RG according to the AMBR parameter.

There is a device for allocating a resource of a fixed broadband network, the device including:

a transmitting component configured to transmit a session establishment request carrying the identifier of an access line corresponding to a Residential Gateway (RG) to a Policy and Charging Rule Function (PCRF) upon determining completed authentication of the RG;

a receiving component configured to receive a session establishment response returned by the PCRF; and a multiplexing component configured, when there are devices accessing through the RG, to statistical multiplex a bandwidth resource of the access line corresponding to the RG among the devices accessing through the RG according to an Aggregated Maximum Bit Rate (AMBR) parameter carried in the session establishment response.

There is a device for allocating a resource of a fixed broadband network, the device including:

a request receiving component configured to receive a session establishment request, transmitted by an Internet Protocol (IP) edge gateway upon determining authentication of n Residential Gateway (RG) is completed, the session establishment request carries an identifier of an access line corresponding to the RG; and a responding component configured to send a session establishment response carrying an Aggregated Maximum Bit Rate (AMBR) parameter to the IP edge gateway, and when there are devices accessing through the RG, to statistical multiplex a bandwidth resource of the access line corresponding to the RG among the devices accessing through the RG according to the AMBR parameter.

There is a system for allocating a resource of a fixed broadband network, the system including:

an Internet Protocol (IP) edge gateway configured to transmit a session establishment request carrying the identifier of an access line corresponding to a Residential Gateway (RG) to a Policy and Charging Rule Function (PCRF) upon determining completed authentication of the RG; to receive a session establishment response sent by the PCRF; and when there are devices accessing through the RG, to statistical multiplex a bandwidth resource of the access line corresponding to the RG among the devices accessing through the RG according to an Aggregated Maximum Bit Rate (AMBR) parameter carried in the session establishment response; and the PCRF configured to receive the session establishment request, transmitted by the IP edge gateway upon determining completed authentication of the RG, carrying the identifier of the access line corresponding to the RG; and to return the session establishment response carrying the AMBR parameter to the IP edge gateway.

With a method, device and system for allocating a resource of a fixed broadband network according to the embodiments of the disclosure, after an RG accesses, a PCRF transmits an AMBR parameter for an access line corresponding to the RG to an IP edge gateway, and when there are devices accessing through the RG, the IP edge gateway statistical multiplexes a bandwidth resource of the access line corresponding to the RG among the devices accessing through the RG according to the AMBR parameter to thereby improve the ratio of utilizing the network resource.

DETAILED DESCRIPTION

With a method, device and system for allocating a resource of a fixed broadband network according to the embodiments of the disclosure, after an RG accesses, a PCRF transmits an AMBR parameter for an access line corresponding to the RG to an IP edge gateway, and when there are devices accessing through the RG, the IP edge gateway statistical multiplexes a bandwidth resource of the access line corresponding to the RG among the devices accessing through the RG according to the AMBR parameter to thereby improve the ratio of utilizing the network resource.

Figure 1:
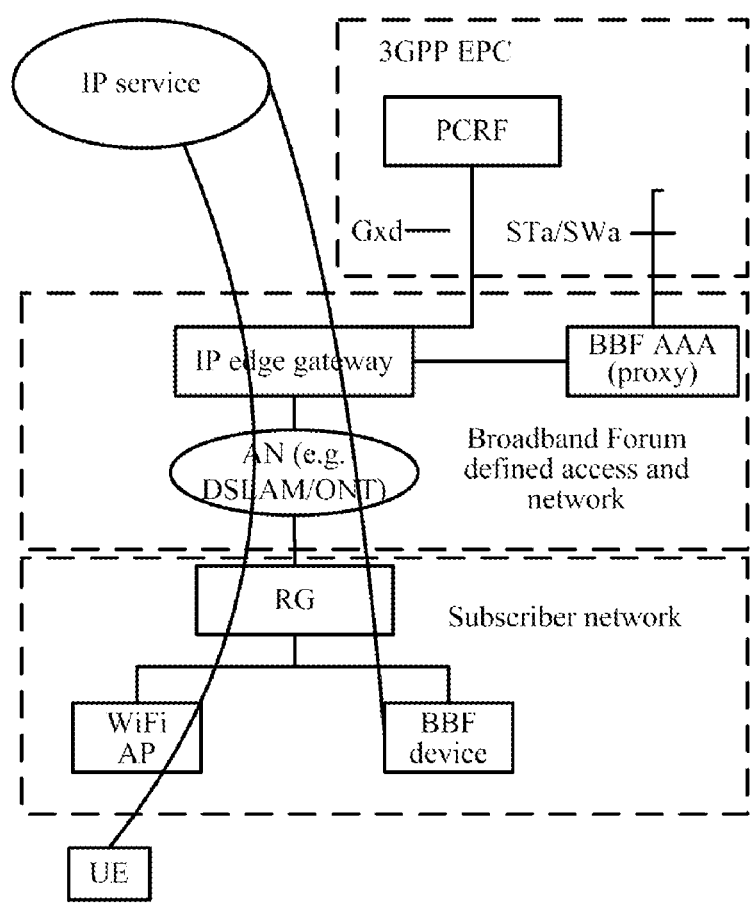
FIG. 1 illustrates a schematic architectural diagram of the 3GPP UE and the fixed device accessing over the fixed broadband network in the prior art.
Figure 2:
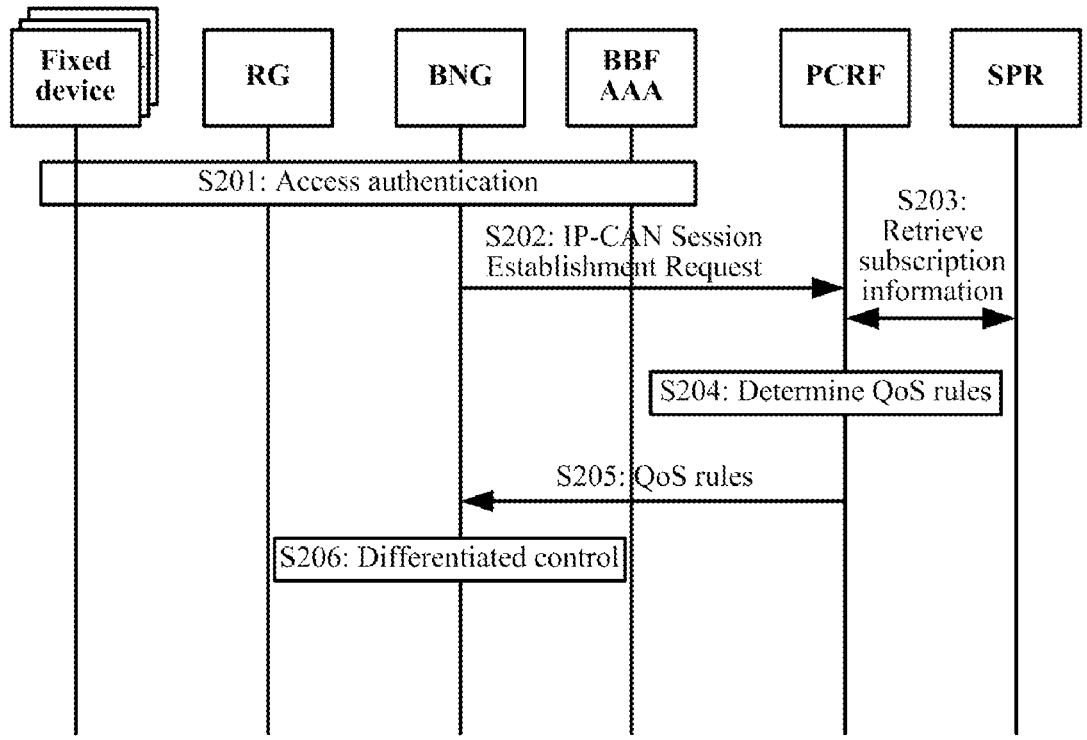
FIG. 2 illustrates a flow chart of setting up an IP-CAN session in the prior art.
Figure 3:
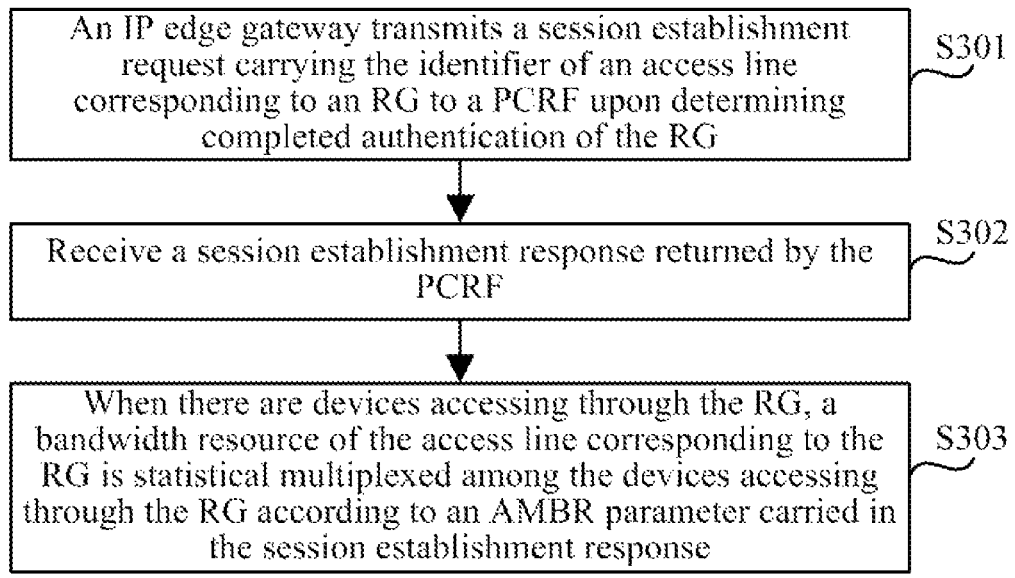
FIG. 3 illustrates a flow chart of a method for allocating a resource of a fixed broadband network according to an embodiment of the disclosure.

Particularly as illustrated in FIG. 3, a method for allocating a resource of a fixed broadband network according to an embodiment of the disclosure includes:

Operation S301. An IP edge gateway transmits a session establishment request carrying the identifier of an access line corresponding to an RG to a PCRF upon determining completed authentication of the RG;

Operation S302. A session establishment response sent by the PCRF is received; and Operation S303. When there are devices accessing through the RG, a bandwidth resource of the access line corresponding to the RG is statistical multiplexed among the devices accessing through the RG according to an AMBR parameter carried in the session establishment response.

The IP edge gateway is a border gateway in the fixed broadband network, and the BGN is a form of the IP edge gateway, although the method for allocating a resource of a fixed broadband network will be described in details in the embodiment of the disclosure taking a BNG as an example.

Particularly a resource allocated for an RG (which can be embodied as a parameter in an QoS rule for the RG) can be shared through being statistical multiplexed among a plurality of devices accessing through the RG, or a core network can alternatively allocate separate resources for the respective devices (which can be embodied by parameters in QoS rules for the respective devices), and the IP edge gateway can determine a bandwidth to be allocated to the current device according to a resource allocation condition of the device.

The AMBR parameter is added to the QoS rule allocated for the RG, and if there is only one device accessing through the RG and no QoS policy is allocated separately by the core network for the device, or a separate QoS policy is allocated but a maximum bit rate of the device is not restricted, then the device can occupy exclusively the entire bandwidth resource restricted by the AMBR, and if there are a plurality of devices accessing concurrently, then the plurality of devices can share the bandwidth resource restricted by the AMBR, and a particular share of the bandwidth resource to be occupied by each device can be determined by a real condition.

For example, if there is an AMBR value of 100M allocated for the access line over which a device A, a device B and a device C access concurrently, and the PCRF does not allocate corresponding maximum bit rates separately for the devices A, B and C, then the devices A, B and C can share the AMBR of the access line. Particularly if there are single data flows of the devices A, B and C, which are data flows 1, 2 and 3, then the fixed broadband network can provide the data flow 1 with a data rate of 30M, the data flow 2 with a data rate of 40M and the data flow 3 with a data rate of 30M. After the device 3 leaves the fixed broadband network, the fixed broadband network can allocate the data flows 1 and 2 respectively with data rates of 40M and 60M.

Figure 4:
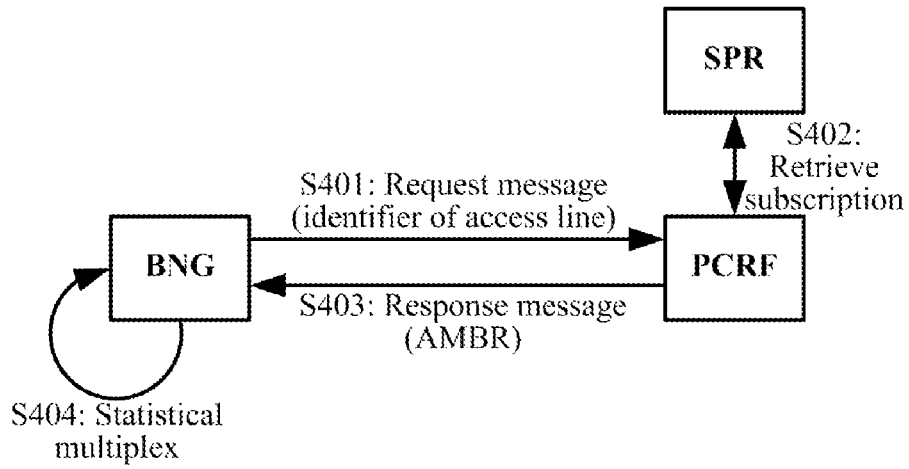
FIG. 4 illustrates a flow chart of a particular method for allocating a resource of a fixed broadband network according to an embodiment of the disclosure.

As illustrated in FIG. 4, an AMBR is issued and applied particularly as follows:

Operation S401. A BNG initiates to a PCRF a session establishment request carrying the identifier of the access line corresponding to the RG, and an optional Access Point Name (APN);

Operation S402. The PCRF can retrieve a subscription from an SPR upon reception of the request message, and at this time, the PCRF can provide the SPR with the identifier of the access line corresponding to the RG, and the optional APN;

Operation S403. The PCRF returns a corresponding AMBR in a session establishment response; and Operation S404. The BNG statistical multiplexes a resource of the access line corresponding to the RG based upon the received AMBR. Particularly when there are a plurality of devices subsequently accessing the access line through the RG, the plurality of devices can multiplex the bandwidth resource restricted by the AMBR of the access line.

In the operation S403, upon reception of request messages, for the identifier of the same access line, the PCRF can return the AMBR only upon reception of the first request message.

The PCRF can retrieve the AMBR only according to the identifier of the access line or can retrieve the corresponding AMBR according to the identifier of the access line and the APN.

In the embodiment of the disclosure, there is a session established as an IP-CAN session, and of course, those skilled in the art can establish another session in the method for allocating a resource of a fixed broadband network according to the embodiment of the disclosure.

The method for allocating a resource of a fixed broadband network according to the embodiment of the disclosure will be described below in particular embodiments thereof.

First Embodiment

When an RG is activated in a fixed broadband network, a BNG initiates an IP-CAN session establishment request to a PCRF, and the PCRF returns a corresponding AMBR to the BNG. Subsequently a plurality of fixed devices access the fixed broadband network sequentially, and the BNG initiates an IP-CAN session respectively for each device, but IP connections corresponding to the respective devices share a bandwidth resource restricted by the AMBR.

At this time, in the operation S303, when there are devices accessing through the RG, the bandwidth resource of an access line corresponding to the RG is statistical multiplexed among the devices accessing through the RG according to the AMBR parameter carried in the sessions establishment response particularly as follows:

The BNG transmits to the PCRF the session establishment request carrying the identifier of the access line and the identifiers of the fixed devices accessing through the RG upon determining completed access authentication of the fixed devices; and The BNG allocates the bandwidth resource of the access line corresponding to the RG for the fixed devices according to the AMBR parameter, and QoS parameters for the fixed devices carried in the session establishment response returned by the PCRF upon reception of the session establishment response.

Figure 5:
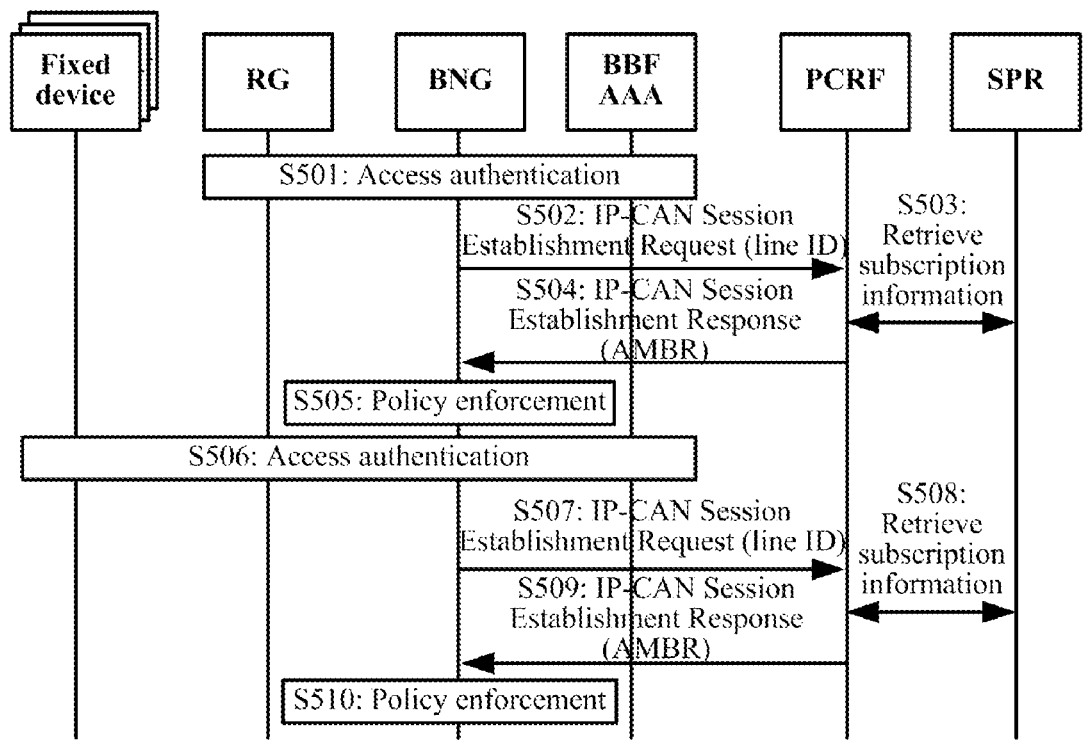
FIG. 5 illustrates a flow chart of a method for allocating a resource of a fixed broadband network according to a first embodiment of the disclosure.

Particularly as illustrated in FIG. 5, the method of allocating a resource of a fixed broadband network includes:

Operation S501. An RG is activated to starting an access authentication procedure in which an BNG retrieves the identifier of an access line corresponding to the RG;

Operation S502. The BNG initiates an IP-CAN session establishment request carrying the identifier of the access line corresponding to the RG;

Operation S503. A PCRF retrieves subscription information from an SPR upon reception of the request;

Operation S504. The PCRF returns an IP-CAN session establishment response carrying an AMBR;

Operation S505. The BNG enforces a policy under a QoS rule in the received response message;

Operation S506. Fixed devices access the network to initiate an access authentication procedure;

Operation S507. The BNG is triggered by the access authentication to initiate an IP-CAN session establishment request including the identifier of the access line and further possibly the subscription identifiers of the fixed devices;

Operation S508. The PCRF retrieves subscription information from the SPR upon reception of the request;

Operation S509. The PCRF returns an IP-CAN establishment response including QoS rules for the devices; and Operation S510. The BNG enforces policies so that the plurality of devices share a bandwidth resource restricted by the allocated AMBR.

Second Embodiment

When an RG is activated in a fixed broadband network, a BNG initiates an IP-CAN session to a PCRF, and the PCRF returns a corresponding AMBR to the BNG. Subsequently a plurality of 3GPP UEs access the fixed broadband network in a non-seamless offloading manner, and the BNG initiates an IP-CAN session for each UE, but all the UEs share a bandwidth resource restricted by the AMBR.

At this time in the operation S303, when there are devices accessing through the RG, the bandwidth resource of the access line corresponding to the RG is statistical multiplexed among the devices accessing through the RG particularly as follows:

The BNG transmits to the PCRF a session establishment request carrying the identifier of the access line and the identifiers of the 3GPP UEs accessing through the RG upon determining completed access authentication of the 3GPP UEs; and The BNG allocates the bandwidth resource of the access line corresponding to the RG for the 3GPP UEs according to the AMBR parameter, and QoS parameters for the 3GPP UEs carried in the session establishment response returned by the PCRF upon reception of the session establishment response.

Figure 6:
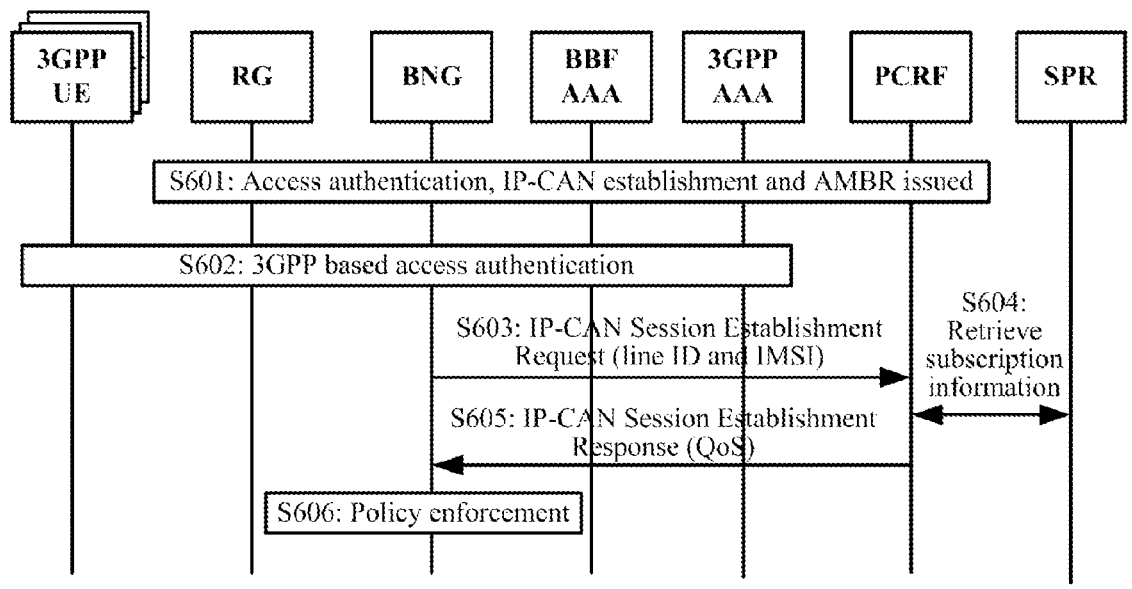
FIG. 6 illustrates a flow chart of a method for allocating a resource of a fixed broadband network according to a second embodiment of the disclosure.

Particularly as illustrated in FIG. 6, there is illustrated a 3GPP AAA which is an entity required to authenticate a 3GPP UE, and the method for allocating a resource of a fixed broadband network includes:

Operation S601. Access authentication of an RG being activated, and establishment of an IP-CAN session and issuing of an AMBR via a Gxd interface, are performed as in the operations S501 to S505 in the first embodiment, so a repeated description thereof will be omitted here;

Operation S602. 3GPP UEs access a fixed broadband network to initiate an access authentication procedure;

Operation S603. A BNG initiates an IP-CAN session establishment request carrying the identifier of an access line, the IMSIs of the UEs and other information;

Operation S604. A PCRF retrieves subscription information of the UEs;

Operation S605. The PCRF sents an IP-CAN session establishment response carrying QoS rules for the 3GPP UE to the BNG; and Operation S606. The BNG enforces a policy and statistical multiplexes a network resource among the UEs, accessing the fixed broadband network in a non-seamless offloading manner, based upon the AMBR.

It shall be noted that a fixed device and a 3GPP UE can access the network concurrently through an RG, and both the fixed device and the 3GPP UE can access the bandwidth resource restricted by the AMBR of the access line.

Third Embodiment

When an RG is activated in a fixed broadband network, a BNG initiates an IP-CAN session to a PGRF, and the PCRF returns a corresponding AMBR to the BNG. Subsequently the AMBR is changed, and the PCRF notifies the BNG via a Gxd interface.

At this time the method for allocating a resource of a fixed broadband network further includes:

The BNG receives a session modification request transmitted by the PCRF upon determining an update to the AMBR of the access line; and The BNG returns a session modification response to the PCRF and statistical multiplexes a bandwidth resource of the access line according to the updated AMBR carried in the session modification request.

Particularly if AMBR information is stored in an SPR, then the PCRF can determine the update to the AMBR of the access line particularly as follows: the PCRF receives AMBR change information transmitted by the SPR, that is, the PCRF receives the changed AMBR notified by the SPR; or the PCRF adjusts the AMBR of the access line when there is a fixed device or a 3GPP UE accessing or leaving the access line, and particularly the PCRF finds out the fixed device or the 3GPP UE accessing or leaving the access line from a session modification request or a session termination request transmitted by an IP edge gateway for the fixed device or the 3GPP UE.

Figure 7:
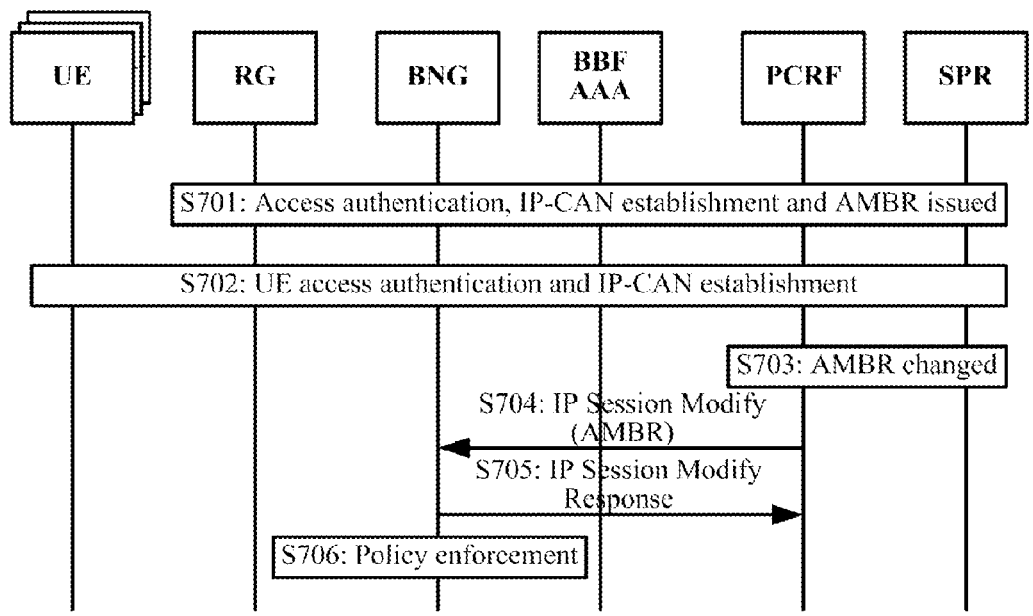
FIG. 7 illustrates a flow chart of a method for allocating a resource of a fixed broadband network according to a third embodiment of the disclosure.

Particularly as illustrated in FIG. 7, the method for allocating a resource of a fixed broadband network includes:

Operation S701. Access authentication of an RG being activated, and establishment of an IP-CAN session and issuing of an AMBR via a Gxd interface, are performed as in the operations S501 to S505 in the first embodiment, so a repeated description thereof will be omitted here;

Operation S702. Access authentication, and establishment of IP-CAN sessions, of a fixed device and/or a 3GPP UE is performed as in the operations S506 to S510 in the first embodiment and/or the operations S602 to S606 in the second embodiment, so a repeated description thereof will be omitted here;

Operation S703. The AMBR of an access line is changed, and if AMBR information is stored in an SPR, then the SPR notifies a PCRF of the changed AMBR, and if the change to the AMBR is triggered by the fixed device or the 3GPP UE accessing or leaving, then the AMBR is adjusted by the PCRF;

Operation S704. The PCRF initiates an IP-CAN session modification procedure to the BNG to issue the updated AMBR;

Operation S705. The BNG sends an IP-CAN session modification response; and

Operation S706. The BNG enforces a policy based upon the updated AMBR.

Figure 8:
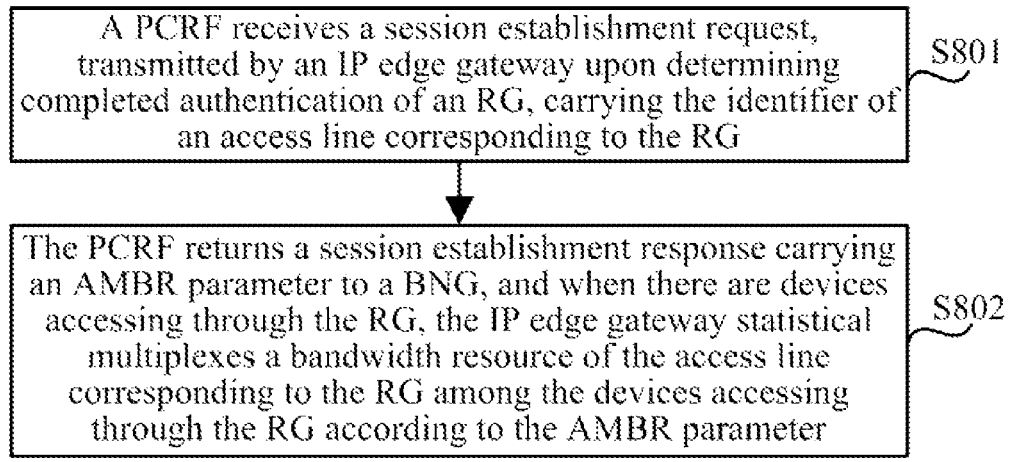
FIG. 8 illustrates a flow chart of a method for allocating by a PCRF a resource of a fixed broadband network according to an embodiment of the disclosure.

An embodiment of the disclosure further correspondingly provides a method for allocating by a PCRF a resource of a fixed broadband network as illustrated in FIG. 8, the method including:

Operation S801. A PCRF receives a session establishment request, transmitted by an IP edge gateway upon determining completed authentication of an RG, carrying the identifier of an access line corresponding to the RG; and Operation S802. The PCRF returns a session establishment response carrying an AMBR parameter to a BNG, and when there are devices accessing through the RG, the IP edge gateway statistical multiplexes a bandwidth resource of the access line corresponding to the RG among the devices accessing through the RG according to the AMBR parameter.

When the AMBR is changed, the PCRF can notify the BNG via a Gxd interface, and at this time, the method further includes:

The PCRF transmits a session modification request to the BNG upon determining an update to the AMBR of the access line; and The PCRF receives a session modification response returned by the BNG, and the IP edge gateway statistical multiplexes the bandwidth resource of the access line according to the updated AMBR carried in the session modification request.

Particularly the PCRF determines the update to the AMBR of the access line particularly as follows: the PCRF adjusts the AMBR of the access line upon determining a fixed device or a 3GPP UE accessing or leaving the access line, or the PCRF receives AMBR change information transmitted by an SPR.

An embodiment of the disclosure further correspondingly provides a device for allocating a resource of a fixed broadband network, and the device can particularly be an IP edge gateway as illustrated, the device including:

A transmitting component 901 is configured to transmit a session establishment request carrying the identifier of an access line corresponding to an RG to a Policy and Charging Rule Function (PCRF) upon determining completed authentication of the RG;

A receiving component 902 is configured to receive a session establishment response returned by the PCRF; and A multiplexing component 903 is configured, when there are devices accessing through the RG, to statistical multiplex a bandwidth resource of the access line corresponding to the RG among the devices accessing through the RG according to an Aggregated Maximum Bit Rate (AMBR) parameter carried in the session establishment response.

In correspondence to the first embodiment, the multiplexing component 903 is configured:

To transmit to the PCRF the session establishment request carrying the identifier of the access line and the identifiers of the fixed devices accessing through the RG upon determining completed access authentication of the fixed devices; and To allocate the bandwidth resource of the access line corresponding to the RG for the fixed devices according to the AMBR parameter, and QoS parameters for the fixed devices carried in the session establishment response sent by the PCRF upon reception of the session establishment response.

In correspondence to the second embodiment, the multiplexing component 903 is configured:

To transmit to the PCRF a session establishment request carrying the identifier of the access line and the identifiers of the 3GPP UEs accessing through the RG upon determining completed access authentication of the 3GPP UEs; and To allocate the bandwidth resource of the access line corresponding to the RG for the 3GPP UEs according to the AMBR parameter, and QoS parameters for the 3GPP UEs carried in the session establishment response returned by the PCRF upon reception of the session establishment response.

In correspondence to the third embodiment, the multiplexing component 903 is further configured:

To receive a session modification request transmitted by the PCRF upon determining an update to the AMBR of the access line; and To send a session modification response to the PCRF and to statistical multiplex a bandwidth resource of the access line according to the updated AMBR carried in the session modification request.

Figure 9A:
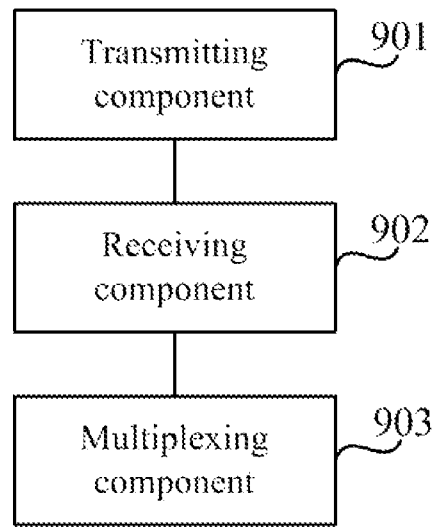
FIG. 9A illustrates a first schematic functional structural diagram of a device for allocating a resource of a fixed broadband network according to an embodiment of the disclosure.
Figure 9B:
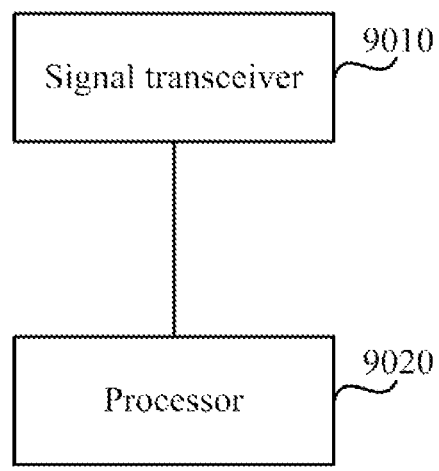
FIG. 9B illustrates a first schematic physical structural diagram of a device for allocating a resource of a fixed broadband network according to an embodiment of the disclosure.

Particularly in hardware, the transmitting component 901 and the receiving component 902 can be signal transceivers including transmit and receive antennas, etc., and the multiplexing component 903 can be processor, and at this time, as illustrated in FIG. 9B, a device for allocating a resource of a fixed broadband network according to an embodiment of the disclosure includes:

A signal transceiver 9010 is configured to transmit a session establishment request carrying the identifier of an access line corresponding to an RG to a Policy and Charging Rule Function (PCRF) upon determining completed authentication of the RG; and to receive a session establishment response sent by the PCRF; and A processor 9020 is configured to, when there are devices accessing through the RG, to statistical multiplex a bandwidth resource of the access line corresponding to the RG among the devices accessing through the RG according to an Aggregated Maximum Bit Rate (AMBR) parameter carried in the session establishment response.

In correspondence to the first embodiment, the processor 9020 is configured:

To transmit to the PCRF the session establishment request carrying the identifier of the access line and the identifiers of the fixed devices accessing through the RG upon determining completed access authentication of the fixed devices; and To allocate the bandwidth resource of the access line corresponding to the RG for the fixed devices according to the AMBR parameter, and QoS parameters for the fixed devices carried in the session establishment response returned by the PCRF upon reception of the session establishment response.

In correspondence to the second embodiment, the processor 9020 is configured:

To transmit to the PCRF a session establishment request carrying the identifier of the access line and the identifiers of the 3GPP UEs accessing through the RG upon determining completed access authentication of the 3GPP UEs; and To allocate the bandwidth resource of the access line corresponding to the RG for the 3GPP UEs according to the AMBR parameter, and QoS parameters for the 3GPP UEs carried in the session establishment response returned by the PCRF upon reception of the session establishment response.

In correspondence to the third embodiment, the processor 9020 is further configured:

To receive a session modification request transmitted by the PCRF upon determining an update to the AMBR of the access line; and To return a session modification response to the PCRF and to statistical multiplex a bandwidth resource of the access line according to the updated AMBR carried in the session modification request.

Figure 10A:
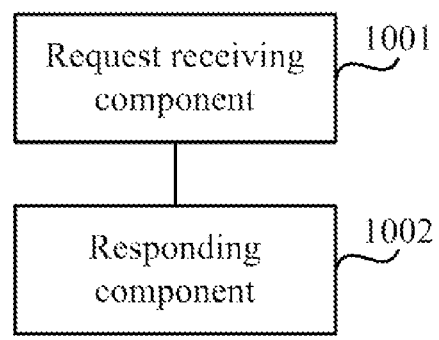
FIG. 10A illustrates a second schematic functional structural diagram of a device for allocating a resource of a fixed broadband network according to an embodiment of the disclosure.

An embodiment of the disclosure further correspondingly provides a device for allocating a resource of a fixed broadband network, and the device can particularly be a PCRF as illustrated in FIG. 10A, the device including:

A request receiving component 1001 is configured to receive a session establishment request, transmitted by an IP edge gateway upon determining completed authentication of an RG, carrying the identifier of an access line corresponding to the RG; and A responding component 1002 is configured to return a session establishment response carrying an AMBR parameter to a BNG, and when there are devices accessing through the RG, to statistical multiplex a bandwidth resource of the access line corresponding to the RG among the devices accessing through the RG according to the AMBR parameter.

When the AMBR is changed, the PCRF can notify the IP edge gateway via a Gxd interface, and at this time, the device further includes:

A session modifying component is configured to transmit a session modification request to the IP edge gateway upon determining an update to the AMBR of the access line so that the IP edge gateway statistical multiplexes the bandwidth resource of the access line according to the updated AMBR carried in the session modification request; and to receive a session modification response returned by the IP edge gateway.

Figure 10B:
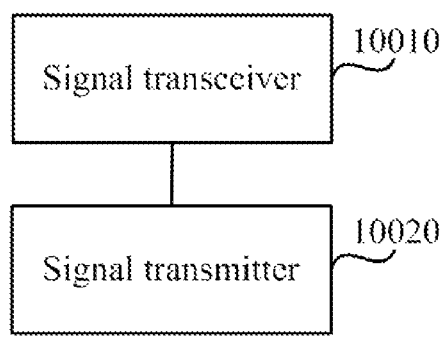
FIG. 10B illustrates a second schematic physical structural diagram of a device for allocating a resource of a fixed broadband network according to an embodiment of the disclosure.

Particularly in hardware, the request receiving component 1001 and the responding component 1002 can be a signal receiver including a receive antenna, etc., and a signal transmitter including a transmit antenna, etc., and at this time, as illustrated in FIG. 10B, a device for allocating a resource of a fixed broadband network according to an embodiment of the disclosure includes:

A signal receiver 10010 is configured to receive a session establishment request, transmitted by an IP edge gateway upon determining completed authentication of an RG, carrying the identifier of an access line corresponding to the RG; and A signal transmitter 10020 is configured to return a session establishment response carrying an AMBR parameter to a BNG, and when there are devices accessing through the RG, to statistical multiplex a bandwidth resource of the access line corresponding to the RG among the devices accessing through the RG according to the AMBR parameter.

When the AMBR is changed, the PCRF can notify the IP edge gateway via a Gxd interface, and at this time, the signal transmitter is further configured to transmit a session modification request to the IP edge gateway upon determining an update to the AMBR of the access line so that the IP edge gateway statistical multiplexes the bandwidth resource of the access line according to the updated AMBR carried in the session modification request; and the signal receiver 10010 is further configured to receive a session modification response returned by the IP edge gateway.

Figure 11:
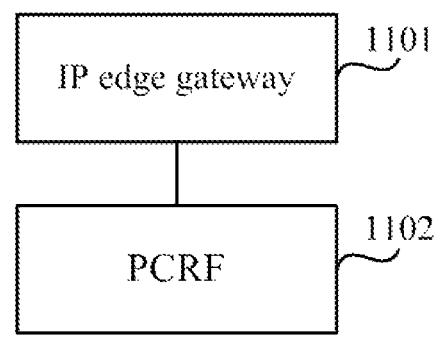
FIG. 11 illustrates a schematic structural diagram of a system for allocating a resource of a fixed broadband network according to an embodiment of the disclosure.

An embodiment of the disclosure further provides a system for allocating a resource of a fixed broadband network as illustrated in FIG. 11, the system including:

An IP edge gateway 1101 is configured to transmit a session establishment request carrying the identifier of an access line corresponding to an RG to a PCRF upon determining completed authentication of the RG; to receive a session establishment response returned by the PCRF; and when there are devices accessing through the RG, to statistical multiplex a bandwidth resource of the access line corresponding to the RG among the devices accessing through the RG according to an AMBR parameter carried in the session establishment response; and The PCRF 1102 is configured to receive the session establishment request, transmitted by the IP edge gateway upon determining completed authentication of the RG, carrying the identifier of the access line corresponding to the RG; and to send the session establishment response carrying the AMBR parameter to the IP edge gateway.

With a method, device and system for allocating a resource of a fixed broadband network according to the embodiments of the disclosure, after an RG accesses, a PCRF transmits an AMBR parameter for an access line corresponding to the RG to an IP edge gateway, and when there are devices accessing through the RG, the IP edge gateway statistical multiplexes a bandwidth resource of the access line corresponding to the RG among the devices accessing through the RG according to the AMBR parameter to thereby improve the ratio of utilizing the network resource.

Those skilled in the art shall appreciate that the embodiments of the disclosure can be embodied as a method, a system or a computer program product. Therefore the disclosure can be embodied in the form of an all-hardware embodiment, an all-software embodiment or an embodiment of software and hardware in combination. Furthermore the disclosure can be embodied in the form of a computer program product embodied in one or more computer useable storage mediums (including but not limited to a disk memory, a CD-ROM, an optical memory, etc.) in which computer useable program codes are contained.

The disclosure has been described in a flow chart and/or a block diagram of the method, the device (system) and the computer program product according to the embodiments of the disclosure. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational operations are performed on the computer or the other programmable data processing device to create a computer implemented process so that the instructions executed on the computer or the other programmable device provide operations for performing the functions specified in the flow(s) of the flow chart and/or the block(s) of the block diagram.

Although the preferred embodiments of the disclosure have been described, those skilled in the art benefiting from the underlying inventive concept can make additional modifications and variations to these embodiments. Therefore the appended claims are intended to be construed as encompassing the preferred embodiments and all the modifications and variations coming into the scope of the disclosure.

Evidently those skilled in the art can make various modifications and variations to the disclosure without departing from the spirit and scope of the disclosure. Thus the disclosure is also intended to encompass these modifications and variations thereto so long as the modifications and variations come into the scope of the claims appended to the disclosure and their equivalents.

The invention claimed is:

1. A method for allocating a resource of a fixed broadband network, wherein the method comprises:

transmitting, by an Internet Protocol, IP, edge gateway, a session establishment request to a Policy and Charging Rule Function, PCRF, upon determining authentication of a Residential Gateway, RG, is completed, the session establishment request carries an identifier of an access line corresponding to the RG;

receiving a session establishment response sent by the PCRF; and when there are devices accessing through the RG, statistical multiplexing a bandwidth resource of the access line corresponding to the RG among the devices accessing through the RG according to an Aggregated Maximum Bit Rate, AMBR, parameter carried in the session establishment response;

wherein the method further comprises:
  receiving, by the IP edge gateway, a session modification request transmitted by the PCRF upon determining an update to the AMBR of the access line corresponding to the RG among the devices accessing through the RG; and
  returning a session modification response to the PCRF and statistical multiplexing the bandwidth resource of the access line corresponding to the RG among the devices accessing through the RG according to the updated AMBR carried in the session modification request.

2. The method of claim 1, wherein when there are devices accessing through the RG, the statistical multiplexing the bandwidth resource of the access line corresponding to the RG among the devices accessing through the RG according to the AMBR parameter carried in the session establishment response comprises:
  transmitting, by the IP edge gateway, to the PCRF the session establishment request carrying the identifier of the access line and identifiers of the fixed devices accessing through the RG upon determining completed access authentication of the fixed devices; and
  allocating the bandwidth resource of the access line corresponding to the RG for the fixed devices according to the AMBR parameter, and QoS parameters for the fixed devices carried in the session establishment response returned by the PCRF upon reception of the session establishment response; and/or
  transmitting, by the IP edge gateway, to the PCRF a session establishment request carrying the identifier of the access line and identifiers of the $3^{rd}$ Generation Partnership Project, 3GPP, User Equipments, UEs, accessing through the RG upon determining completed access authentication of the 3GPP UEs; and allocating the bandwidth resource of the access line corresponding to the RG for the 3GPP UEs according to the AMBR parameter, and QoS parameters for the 3GPP UEs carried in the session establishment response returned by the PCRF upon reception of the session establishment response.

3. The method of claim 1, wherein the session establishment request further carries an Access Point Name, APN, of the RG.

4. The method of claim 1, wherein the determining, by the PCRF, the update to the AMBR of the access line comprises:
  receiving, by the PCRF, AMBR change information transmitted by Subscription Profile Repository, SPR; or
  adjusting, by the PCRF, the AMBR of the access line when there is a fixed device or a 3GPP UE accessing or leaving the access line.

5. A method for allocating a resource of a fixed broadband network, wherein the method comprises:
  receiving, by a Policy and Charging Rule Function, PCRF, a session establishment request, transmitted by an Internet Protocol, IP, edge gateway upon determining authentication of a Residential Gateway, RG, is completed, the session establishment request carries an identifier of an access line corresponding to the RG; and
  sending, by the PCRF, a session establishment response carrying an Aggregated Maximum Bit Rate, AMBR parameter to the IP edge gateway, and when there are devices accessing through the RG, statistical multiplexing, by the IP edge gateway, a bandwidth resource of the access line corresponding to the RG among the devices accessing through the RG according to the AMBR parameter;
wherein the method further comprises:
  transmitting, by the PCRF, a session modification request to the IP edge gateway upon determining an update to the AMBR of the access line corresponding to the RG among the devices accessing through the RG so that the IP edge gateway statistical multiplexes the bandwidth resource of the access line corresponding to the RG among the devices accessing through the RG according to the updated AMBR carried in the session modification request; and
  receiving a session modification response sent by the IP edge gateway.

6. A device for allocating a resource of a fixed broadband network, wherein the device comprises:
  a transmitting component configured to transmit a session establishment request carrying an identifier of an access line corresponding to a Residential Gateway, RG to a Policy and Charging Rule Function, PCRF upon determining completed authentication of the RG;
  a receiving component configured to receive a session establishment response sent by the PCRF; and
  a multiplexing component configured, when there are devices accessing through the RG, to statistical multiplex a bandwidth resource of the access line corresponding to the RG among the devices accessing through the RG according to an Aggregated Maximum Bit Rate, AMBR, parameter carried in the session establishment response;
wherein the multiplexing component is further configured:
  to receive a session modification request transmitted by the PCRF upon determining an update to the AMBR of an access line corresponding to the RG among the devices accessing through the RG; and
  to return a session modification response to the PCRF and to statistical multiplex the bandwidth resource of the access line corresponding to the RG among the devices accessing through the RG according to the updated AMBR carried in the session modification request.

7. The device of claim 6, wherein the multiplexing component is configured:
  to transmit to the PCRF the session establishment request carrying the identifier of the access line and identifiers of the fixed devices accessing through the RG upon determining completed access authentication of the fixed devices; and to allocate the bandwidth resource of the access line corresponding to the RG for the fixed devices according to the AMBR parameter, and QoS parameters for the fixed devices carried in the session establishment response returned by the PCRF upon reception of the session establishment response; and/or
  to transmit to the PCRF a session establishment request carrying the identifier of the access line and the identifiers of the $3^{rd}$ Generation Partnership Project, 3GPP User Equipments, UEs accessing through the RG upon determining completed access authentication of the 3GPP UEs; and to allocate allocates the bandwidth resource of the access line corresponding to the RG for the 3GPP UEs according to the AMBR parameter, and QoS parameters for the 3GPP UEs carried in the session establishment response returned by the PCRF upon reception of the session establishment response.

8. A device for allocating a resource of a fixed broadband network, wherein the device comprises:
- a request receiving component configured to receive a session establishment request, transmitted by an Internet Protocol, IP, edge gateway upon determining authentication of a Residential Gateway, RG, is completed, the session establishment request carries an identifier of an access line corresponding to the RG; and
- a responding component configured to send a session establishment response carrying an Aggregated Maximum Bit Rate, AMBR, parameter to the IP edge gateway, and when there are devices accessing through the RG, to statistical multiplex a bandwidth resource of the access line corresponding to the RG among the devices accessing through the RG according to the AMBR parameter;

wherein the device further comprises:
a session modifying component configured to transmit a session modification request to the IP edge gateway upon determining an update to the AMBR of the access line corresponding to the RG among the devices accessing through the RG so that the IP edge gateway statistical multiplexes the bandwidth resource of the access line corresponding to the RG among the devices accessing through the RG according to the updated AMBR carried in the session modification request; and to receive a session modification response sent by the IP edge gateway.

9. The method of claim 2, wherein the determining, by the PCRF, the update to the AMBR of the access line comprises:
- receiving, by the PCRF, AMBR change information transmitted by Subscription Profile Repository, SPR; or
- adjusting, by the PCRF, the AMBR of the access line when there is a fixed device or a 3GPP UE accessing or leaving the access line.

10. The method of claim 3, wherein the determining, by the PCRF, the update to the AMBR of the access line comprises:
- receiving, by the PCRF, AMBR change information transmitted by Subscription Profile Repository, SPR; or
- adjusting, by the PCRF, the AMBR of the access line when there is a fixed device or a 3GPP UE accessing or leaving the access line.

* * * * *